US012636742B2

(12) United States Patent
Drewett et al.

(10) Patent No.: US 12,636,742 B2
(45) Date of Patent: May 26, 2026

(54) AUTOMATED TEMPORARY FASTENER ACTUATION APPARATUS AND SYSTEM

(71) Applicant: Lockheed Martin Corporation, Bethesda, MD (US)

(72) Inventors: Jeffrey T. Drewett, Fort Worth, TX (US); Geoffrey Robert Karpa, Benbrook, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 400 days.

(21) Appl. No.: 18/341,612

(22) Filed: Jun. 26, 2023

(65) Prior Publication Data

US 2024/0424625 A1    Dec. 26, 2024

(51) Int. Cl.
   B23P 19/04     (2006.01)
   B25B 31/00     (2006.01)
   F16B 19/10     (2006.01)

(52) U.S. Cl.
   CPC ............ B23P 19/04 (2013.01); B25B 31/005 (2013.01); F16B 19/109 (2013.01); *B23P 2700/01* (2013.01)

(58) Field of Classification Search
   CPC ...... B23P 19/04; B23P 2700/01; B25B 13/06; B25B 13/10; B25B 13/44; B25B 13/48; B25B 21/002; B25B 21/02; B25B 23/0007; B25B 23/0021; B25B 23/0035; B25B 23/142; B25B 23/147; B25B 31/005;

(Continued)

(56) References Cited

U.S. PATENT DOCUMENTS 2,387,371 A * 10/1945 Wallace ................ B25B 31/005
                                 269/48.3
2,775,155 A * 12/1956 Tompkins ............. B25B 31/005
                                 269/48.3

(Continued)

FOREIGN PATENT DOCUMENTS

BR      102013032814      8/2015
EP       0195851 B1     1/1992

(Continued)

OTHER PUBLICATIONS

Extended European Search Report corresponding to European Patent Application No. 24183198.1, dated Nov. 8, 2024, 7 pages.

*Primary Examiner* — Robert J Scruggs
(74) *Attorney, Agent, or Firm* — Baker Botts L.L.P.

(57) ABSTRACT

A temporary fastener actuation tool includes a protrusion, multiple spring clips, and a bearing shaft. The protrusion includes a groove that matches a shape of an indentation of a temporary fastener. Each spring clip includes an end that is aligned with an end of the protrusion. The spring clips are configured to hold the indentation of the temporary fastener secure against the protrusion. The temporary fastener actuation tool further includes a first bearing that is coupled to the bearing shaft and is configured to contact a cylindrical body of the temporary fastener and rotate the cylindrical body of the temporary fastener in a first direction. The temporary fastener actuation tool further includes a second bearing coupled to the bearing shaft that is configured to contact a stem of the temporary fastener and to rotate the stem in a second direction. A motor shaft is coupled to the bearing shaft.

20 Claims, 5 Drawing Sheets

(58) Field of Classification Search
CPC ...... B25B 15/02; F16B 5/0208; F16B 19/109;
B25F 5/02
See application file for complete search history.

(56) References Cited

U.S. PATENT DOCUMENTS

| | | | |
|---|---|---|---|
| 3,263,320 A * | 8/1966 | Jones ................... | B25B 31/005 |
| | | | 29/466 |
| 4,787,274 A * | 11/1988 | Belanger .............. | B25B 31/005 |
| | | | 81/59.1 |
| 9,102,019 B2 | 8/2015 | Negroni et al. | |
| 9,687,946 B2 * | 6/2017 | Cole ...................... | B23P 19/12 |
| 10,315,311 B2 | 6/2019 | Szarski et al. | |
| 10,343,288 B2 | 7/2019 | Hirashima et al. | |
| 10,435,179 B2 | 10/2019 | Haldimann | |
| 10,792,816 B2 | 10/2020 | Pringle, IV et al. | |
| 11,235,375 B2 | 2/2022 | Oberoi et al. | |
| 2015/0059139 A1 | 3/2015 | Dantas | |
| 2018/0111701 A1 | 4/2018 | Cai et al. | |
| 2020/0198754 A1 | 6/2020 | Oberoi et al. | |

FOREIGN PATENT DOCUMENTS

| | | |
|---|---|---|
| EP | 917920 | 10/2008 |
| GB | 2126146 A | 3/1984 |

* cited by examiner

AUTOMATED TEMPORARY FASTENER ACTUATION APPARATUS AND SYSTEM

TECHNICAL FIELD

This disclosure relates in general to temporary fasteners, and more particularly to an automated temporary fastener actuation apparatus and system.

BACKGROUND

Temporary fasteners, such as Cleco fasteners, are used in manufacturing processes to fasten different materials together during the manufacturing process. As the materials are held together, personnel may perform other processes to physically join the materials. Afterwards, the temporary fasteners are removed from the joined materials for further assembly operations. Current processes to apply and remove temporary fasteners are manual and time-consuming.

SUMMARY OF THE DISCLOSURE

According to one embodiment, a temporary fastener actuation system includes a temporary fastener, a temporary fastener actuation tool, a rotary tool, and a collar. The temporary fastener includes a cylindrical body having an indentation, a compressible gasket, a stem, and a plurality of tines coupled to the stem. The temporary fastener actuation tool includes a protrusion having a groove that matches a shape of the indentation of the temporary fastener. The temporary fastener actuation tool further includes a plurality of spring clips, wherein each spring clip includes an end that is aligned with an end of the protrusion. The spring clips are configured to hold the indentation of the temporary fastener secure against the protrusion. The temporary fastener actuation tool further includes a bearing shaft, a first bearing coupled to the bearing shaft and configured to contact the cylindrical body of the temporary fastener and rotate the cylindrical body of the temporary fastener in a first direction, a second bearing coupled to the bearing shaft and configured to contact the stem of the temporary fastener and rotate the stem of the temporary fastener in the second direction, and a motor shaft coupled to the bearing shaft. The rotary tool is configured to couple to the motor shaft of the fastener removal tool; rotate the motor shaft and the second bearing in the second direction while the first bearing is disengaged from the cylindrical body, thereby causing the plurality of tines to contract; and rotate the motor shaft and the first bearing in the first direction while the second bearing is disengaged from the stem, thereby causing the cylindrical body of the temporary fastener to rotate. The collar is configured to contact the cylindrical body of the temporary fastener and hold the cylindrical body of the temporary fastener stationary when the stem is rotated in the second direction.

According to another embodiment, a temporary fastener actuation system includes a temporary fastener actuation tool, a rotary tool, and a collar. The temporary fastener actuation tool includes a protrusion having a groove that matches a shape of an indentation of a temporary fastener. The temporary fastener actuation tool further includes a plurality of spring clips, each spring clip having an end that is aligned with an end of the protrusion. The spring clips are configured to hold the indentation of the temporary fastener secure against the protrusion. The temporary fastener actuation tool further include a bearing shaft, a first bearing coupled to the bearing shaft and configured to contact a cylindrical body of the temporary fastener and rotate the cylindrical body of the temporary fastener in the first direction, a second bearing coupled to the bearing shaft and configured to contact the stem of the temporary fastener and rotate the stem of the temporary fastener in the second direction, and a motor shaft coupled to the bearing shaft. The rotary tool is configured to couple to the motor shaft of the fastener removal tool; rotate the motor shaft and the second bearing in the second direction while the first bearing is disengaged from the cylindrical body, thereby causing a plurality of tines of the temporary fastener to contract; and rotate the motor shaft and the first bearing in the first direction while the second bearing is disengaged from the stem, thereby causing the cylindrical body of the temporary fastener to rotate. The collar is configured to contact the cylindrical body of the temporary fastener and hold the cylindrical body of the temporary fastener stationary when the stem is rotated in the second direction.

According to another embodiment, a temporary fastener actuation tool includes a protrusion, multiple spring clips, and a bearing shaft. The protrusion includes a groove that matches a shape of an indentation of a temporary fastener. Each spring clip includes an end that is aligned with an end of the protrusion. The spring clips are configured to hold the indentation of the temporary fastener secure against the protrusion. The temporary fastener actuation tool further includes a first bearing coupled to the bearing shaft and configured to contact a cylindrical body of the temporary fastener and rotate the cylindrical body of the temporary fastener in a first direction. The temporary fastener actuation tool further includes a second bearing coupled to the bearing shaft and configured to contact the stem of the temporary fastener and rotate the stem of the temporary fastener in a second direction. The temporary fastener actuation tool further includes a motor shaft coupled to the bearing shaft.

Technical advantages of certain embodiments may include providing an automated temporary fastener actuation apparatus and system. Instead of the typical manual processes currently used to apply and remove temporary fasteners such as Cleco fasteners, the disclosed embodiments quickly and automatically actuate temporary fasteners, thereby saving considerable time and expenses. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

Temporary fasteners, such as Cleco fasteners, are used in manufacturing processes to fasten different materials together during the manufacturing process. As the materials are held together, personnel may perform other processes to physically join the materials. Afterwards, the temporary fasteners are removed from the joined materials for further assembly operations. Current processes to apply and remove temporary fasteners are manual and time-consuming.

To address these and other problems with manually actuating temporary fasteners such as Cleco fasteners, the disclosed embodiments provide an automated temporary fastener actuation tool and system. Instead of the typical manual processes currently used to apply and remove temporary fasteners such as Cleco fasteners, the disclosed embodiments quickly and automatically actuate temporary fasteners, thereby saving considerable time and expenses. To do so, some embodiments utilize a rotary tool such as a multi-function end effector (MFEE) and a temporary fastener actuation tool to actuate a temporary fastener such as a Cleco fastener. The rotary tool rotates a shaft within the temporary fastener actuation tool which in turn automatically actuates the temporary fastener to either remove or apply the temporary fastener to a panel. As a result, a temporary fastener such as a Cleco fastener may be automatically actuated without requiring manual operation by personnel.

To facilitate a better understanding of the present disclosure, the following examples of certain embodiments are given. In no way should the following examples be read to limit or define the scope of the disclosure. Embodiments of the present disclosure and its advantages may be best understood by referring to the included FIGURES, where like numbers are used to indicate like and corresponding parts.

Figure 1:
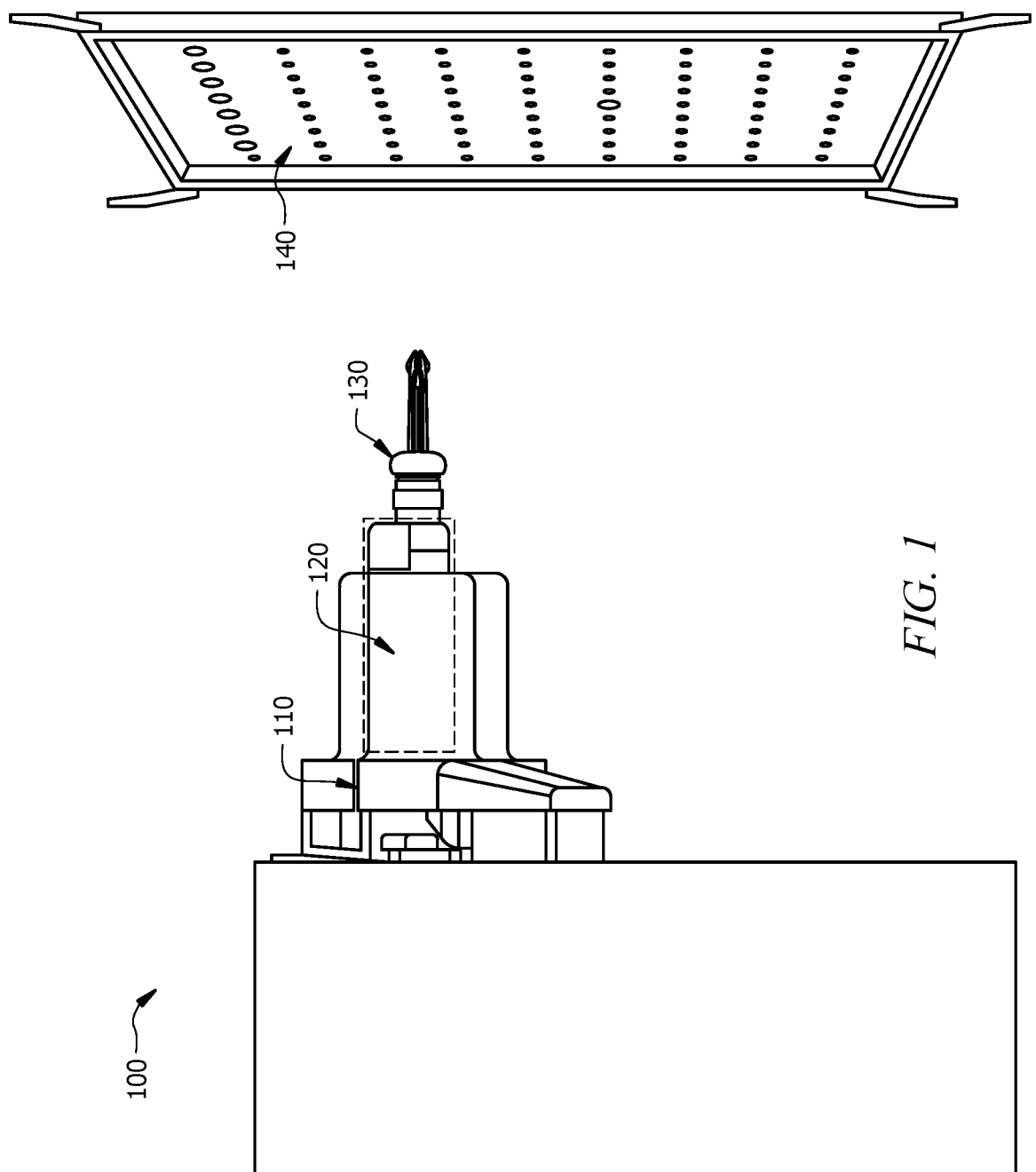
FIG. 1 illustrates an automated temporary fastener actuation system, according to certain embodiments.

FIG. 1 illustrates a temporary fastener actuation system 100, according to certain embodiments. Temporary fastener actuation system 100 included a rotary tool 110, a temporary fastener actuation tool 120, and a temporary fastener 130. In general, temporary fastener actuation tool 120 is coupled to or otherwise manipulated by rotary tool 110. A temporary fastener 130 is inserted into temporary fastener actuation tool 120 and then tines of temporary fastener 130 (i.e., tines 306) are inserted through aligned holes in panels 140. Rotary tool 110 then rotates a shaft (i.e., motor shaft 121) within temporary fastener actuation tool 120 which in turn rotates a stem (i.e., stem 302) of temporary fastener 130. This actuates the tines of temporary fastener 130 and temporarily secures temporary fastener 130 to panels 140, thereby securing panels 140 together for manufacturing purposes. Rotary tool 110 may also rotate motor shaft 121 within temporary fastener actuation tool 120 in an opposite direction in order retract the tines of temporary fastener 130 and loosen temporary fastener 130 from panels 140.

Rotary tool 110 is any appropriate tool or device capable of operating temporary fastener 130 as described herein. In some embodiments, rotary tool 110 is a multi-function end effector (MFEE) or a three-axis robotic system (e.g., from Kuka Aerospace). In general, rotary tool 110 holds or otherwise attaches to temporary fastener actuation tool 120, positions and aligns temporary fastener actuation tool 120 with holes in panel 140, and spins motor shaft 121 within temporary fastener actuation tool 120 in order to actuate temporary fastener 130 as described herein. For example, rotary tool 110 may be configured to rotate motor shaft 121 and inner bearing 126 in a first direction while outer bearing 125 is stationary, thereby causing the tines of temporary fastener 130 to expand. As another example, rotary tool 110 may rotate motor shaft 121 in a second direction (opposite from the first direction) while outer bearing 125 is stationary, thereby causing the tines of temporary fastener 130 to contract. As still another example, rotary tool 110 may be configured to rotate motor shaft 121 and the outer bearing 125 in the first direction while the inner bearing 126 is disengaged from the stem 302, thereby causing the entire body of the temporary fastener 130 to rotate.

Figure 2A:
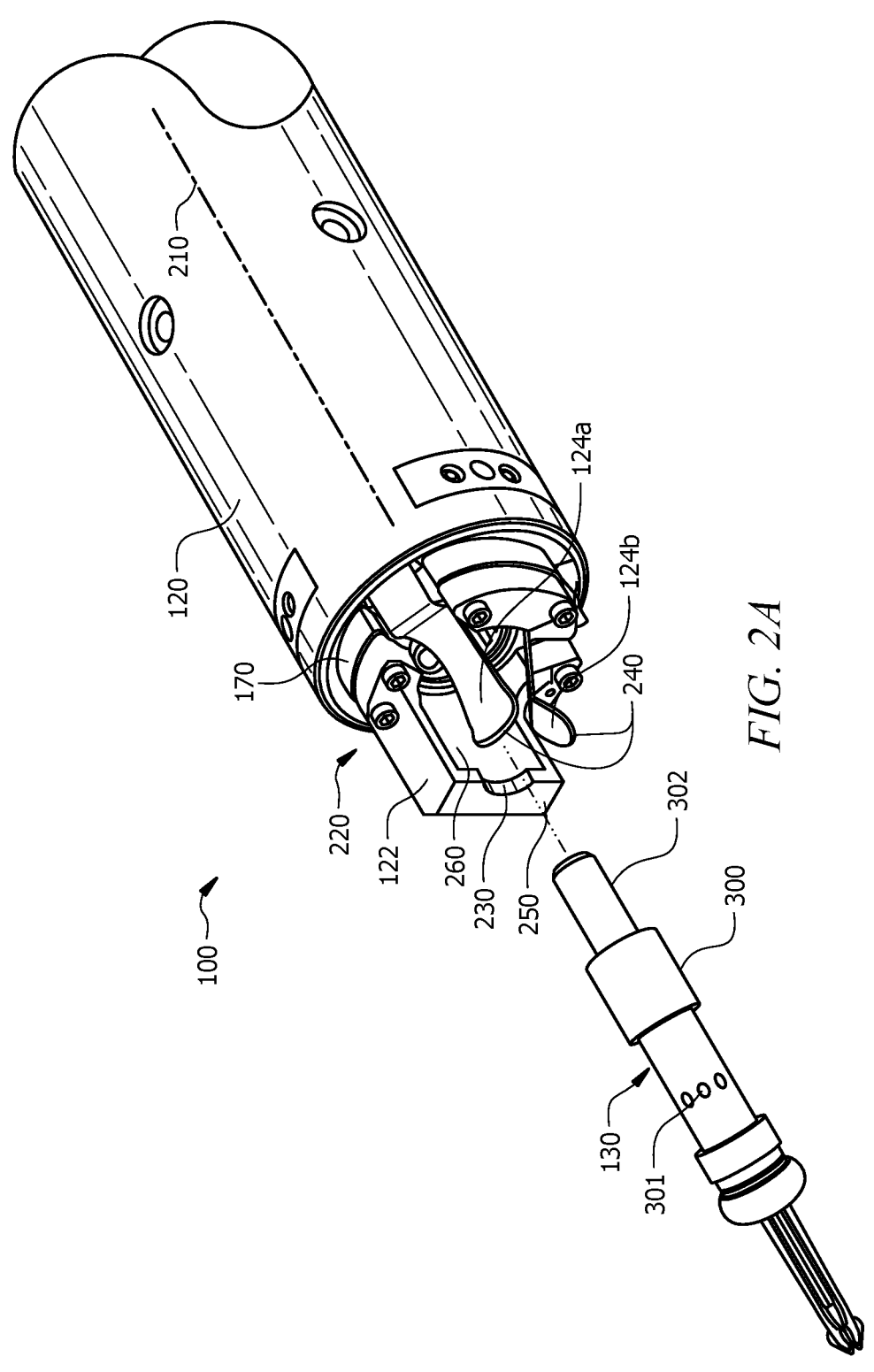
FIGS. 2A and 2B illustrate an automated temporary fastener actuation tool, according to certain embodiments.
Figure 2B:
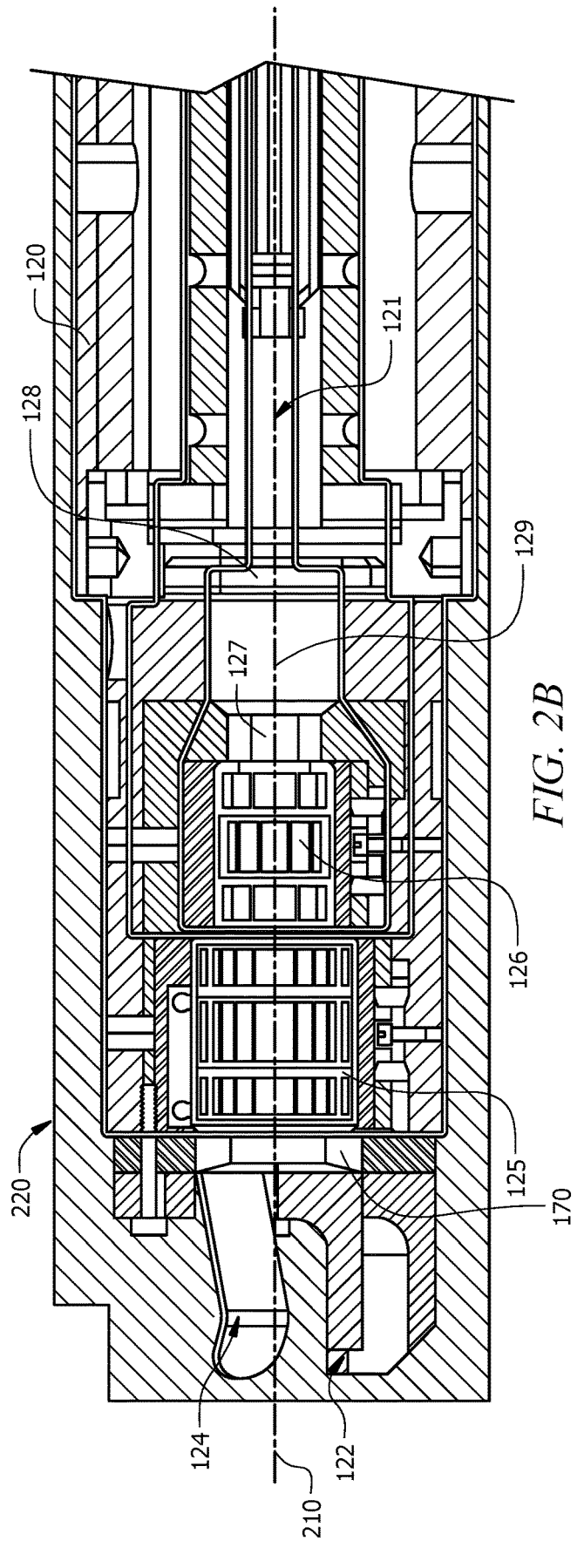

FIGS. 2A and 2B illustrate a temporary fastener actuation tool 120, according to certain embodiments. In some embodiments, temporary fastener actuation tool 120 is generally cylindrical in shape as illustrated. This may allow temporary fastener actuation tool 120 to be at least partially inserted into a tool receptacle of rotary tool 110 and coupled to rotary tool 110. In some embodiments, temporary fastener actuation tool 120 includes a motor shaft 121, a protrusion 122, one or more spring clips 124 (e.g., 124a and 124b), an outer bearing 125, an inner bearing 126, a bearing shaft 127, a spindle 128, and threads 129. Motor shaft 121 is coupled to bearing shaft 127. Both motor shaft 121 and bearing shaft 127 are configured to rotate within temporary fastener actuation tool 120 about an axis 210. In some embodiments, motor shaft 121 includes spindle 128 coupled to one end of motor shaft 121 as illustrated. In such embodiments, bearing shaft 127 includes threads 129 which couple bearing shaft 127 to spindle 128. Motor shaft 121, in general, transfers rotational power from rotary tool 110 to bearing shaft 127 in order to rotate inner bearing 126. This rotates stem 302 of temporary fastener 130, thereby actuating temporary fastener 130.

Protrusion 122 is coupled to an end 220 of temporary fastener 130 as illustrated. In general, protrusion 122 assists in holding temporary fastener 130 within temporary fastener actuation tool 120. In some embodiments, protrusion 122 includes a groove 230 that matches a cross-sectional shape of indentation 301 of temporary fastener 130. For example, if body 300 and indentation 301 are cylindrical in shape as illustrated, groove 230 is circular in shape as illustrated. This allows indentation 301 of temporary fastener 130 to be held firmly in place against protrusion 122 (i.e., indentation 301 rests against groove 230 while a portion of body 300 rests against inside portion 260 of protrusion 122). To help hold temporary fastener 130 against protrusion 122, some embodiments of temporary fastener 130 include one or more spring clips 124. Spring clips 124 are coupled to end 220 of temporary fastener 130 as illustrated. Each spring clip 124 includes an end 240 that is aligned with an end 250 of protrusion 122. Spring clips 124 may be made of metal, plastic, or any other appropriate material that allows spring clips 124 to be flexible and spring-loaded.

In certain embodiments, outer bearing 125 is configured to contact body 300 of temporary fastener 130 and hold body 300 of temporary fastener 130 stationary during actuation of temporary fastener 130. For example, outer bearing 125 may have an inside diameter that permits outer bearing 125 to contact and hold body 300 stationary.

In some embodiments, outer bearing 125 is configured to contact body 300 of temporary fastener 130 and rotate body 300 during actuation of temporary fastener 130. For example, outer bearing 125 may have an inside diameter that permits outer bearing 125 to contact and rotate body 300.

In certain embodiments, outer bearing 125 is located proximate to end 220 of temporary fastener actuation tool 120 as illustrated. In some embodiments, outer bearing 125 is tubular in shape such that at least a portion of temporary fastener 130 may be inserted through outer bearing 125.

Inner bearing 126 is configured to contact stem 302 of temporary fastener 130 and rotate stem 302 during actuation of temporary fastener 130. In some embodiments, inner bearing 126 is located proximate to outer bearing 125 as illustrated. In some embodiments, inner bearing 126 is tubular in shape such that at least a portion of temporary fastener 130 (e.g., stem 302) may be inserted through inner bearing 126. In general, inner bearing 126 has an inside diameter that permits inner bearing 126 to contact and rotate stem 302.

In certain embodiments, collar 170 serves to press fit over a body 300 of temporary fastener 130 to hold body 300 stationary while actuating stem 302 of temporary fastener 130 via inner bearing 126. In some embodiments, collar 170 permits body 300 of temporary fastener 130 to rotate while actuating stem 302 of temporary fastener 130 via outer bearing 125. Collar 170 may be located proximate to end 220 of temporary fastener actuation tool 120 as illustrated. In some embodiments, collar 170 is tubular in shape. Collar 170 may be made of any suitable material (e.g., plastic).

Temporary fastener 130 is any appropriate fastener for holding panels 140 together. In some embodiments, temporary fastener 130 is a Cleco fastener. A particular embodiment of temporary fastener 130 is described in more detail below with respect to FIG. 3.

Panels 140 are materials or objects to be held together during manufacturing. In some embodiments, for example, panels 140 are panels of an aircraft. As another example, panels 140 are panels of an automobile. In general, panels 140 have holes that align and permit temporary fastener 130 to be inserted into for holding panels 140 together.

Figure 3:
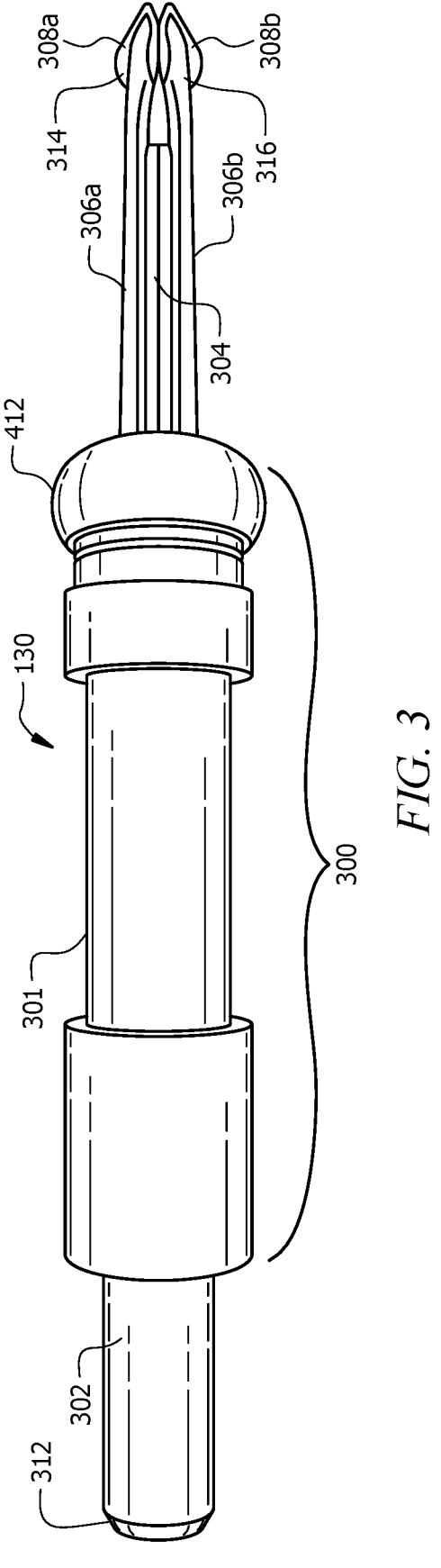
FIG. 3 illustrates a temporary fastener, according to certain embodiments.

FIG. 3 illustrates a temporary fastener 130, according to certain embodiments. Temporary fastener 130 may be any suitable size, height, shape, and any combinations thereof. In some embodiments, temporary fastener 130 may include any suitable materials, including, but not limited to, metals, nonmetals, polymers, ceramics, composites, and any combinations thereof. Without limitations, temporary fastener 130 may be any suitable fastener. In some embodiments, temporary fastener 130 is a Cleco fastener.

In some embodiments, temporary fastener 130 may include a body 300, an indentation 301, a stem 302, a spreader bar 304, a pair of tines 306*a* and 306*b*, a pair of barbs 308*a* and 308*b*, and a compressible gasket 412. Body 300 and indentation 301 may be generally cylindrical in shape, with indentation 301 having a smaller diameter than portions of body 300 on each end of indentation 301 as illustrated. Body 300 may be configured to contain at least a portion of stem 302, and stem 302 may be configured to translate in a reversible direction with respect to body 300. For example, stem 302 may be disposed within and secured to body 300. In one or more embodiments, stem 302 may be threaded into and with the interior of body 300. During operations, a top portion 312 of stem 302 extending out from body 300 may be rotated to translate the stem 302 along a central axis of body 300.

In some embodiments, spreader bar 304 may be coupled to an end of body 300 opposite from top portion 312. As illustrated, spreader bar 304 may extend outwards from body 300, and tines 306 may be disposed adjacent to spreader bar 304. A first tine 306*a* may be disposed along one side of spreader bar 304, and a second tine 306*b* may be disposed along an opposing side of spreader bar 304. Tines 306 may each be coupled to stem 302. As stem 302 is actuated to rotate, spreader bar 304 may remain stationary and tines 306 may translate along with stem 302. In one or more embodiments, tines 306 retract backwards into body 300 and spreader bar 304 may be configured to force tines 306 to expand outwards in a radial direction. In one or more embodiments, tines 306 extend outwards from body 300 and a distance between tines 306 may decrease in the radial direction. In some embodiments, barbs 308 may be disposed at a distal end of tines 306. A first barb 308*a* may be disposed at a distal end 314 of first tine 306*a*, and a second barb 308*b* may be disposed at a distal end 316 of second tine 306*b*. In some embodiments, barbs 308 may translate, expand, and retract subsequently as tines 306 are actuated.

Figure 4A:
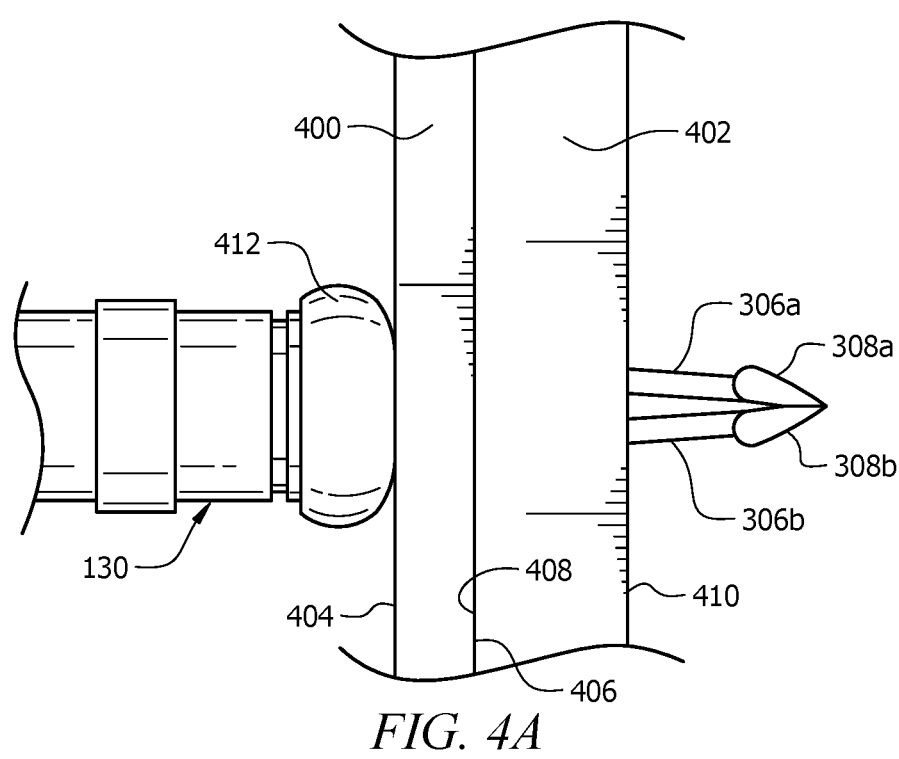
FIGS. 4A and 4B illustrates the temporary fastener of FIG. 3 coupling panels of material together, according to certain embodiments.
Figure 4B:
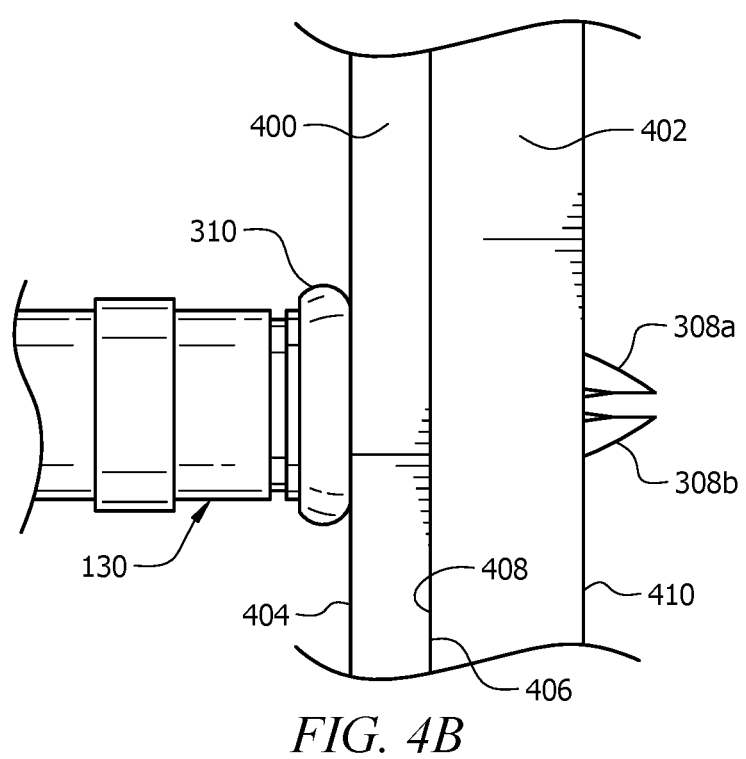

FIGS. 4A and 4B illustrate temporary fastener 130 coupling separate panels of material together. As illustrated, temporary fastener 130 may be at least partially inserted through a hole in a first panel 400 of material and a second panel 402 of material. First panel 400 of material and second panel 402 of material may each be any suitable size, height, shape, and any combinations thereof. In some embodiments, first panel 400 of material and second panel 402 of material may each include any suitable materials, including, but not limited to, metals, nonmetals, polymers, ceramics, composites, and any combinations thereof. In some embodiments, tines 306 and barbs 308 may be inserted through a first side 404 of first panel 400 and exit out a second side 410 of second panel 402, wherein a second side 406 of first panel 400 is disposed against a first side 408 of second panel 402. To exert a force and clamp panels 400 and 402 together, stem 302 (referring to FIG. 3) of the temporary fastener 130 may be rotated to retract tines 306. As tines 306 retract, spreader bar 304 (referring to FIG. 3) may cause tines 306 and subsequently barbs 308 to expand in a radial direction. Barbs 308 may be expanded past the size of the hole of panels 400 and 402 and come to rest against second side 410 of second panel 402. Temporary fastener 130 may then be further actuated and may cause barbs 308 to exert a force backwards against second panel 402. As illustrated, compressible gasket 412 may be disposed at an end of body 300 (referring to FIG. 3) that is operable to provide protection for body 300 and/or for first panel 400. A compressive force may be applied onto both first panel 400 and second panel 402 between gasket 412 and barbs 308, thereby temporarily securing first panel 400 to second panel 402.

In operation, and in reference to FIGS. 1-4B, the disclosed embodiments provide a temporary fastener actuation system 100 that utilizes a temporary fastener actuation tool 120 to automatically actuate a temporary fastener 130. Instead of the typical manual processes currently used to apply and remove temporary fasteners 130 such as Cleco fasteners, the disclosed embodiments quickly and automatically actuate temporary fasteners 130, thereby saving considerable time and expenses. To do so, temporary fastener actuation tool 120 is first coupled or otherwise installed onto rotary tool 110. Next, if temporary fastener 130 is already installed into panel 140, temporary fastener actuation tool 120 is manipulated (either manually or automatically by rotary tool 110) so that axis 210 is aligned with the installed temporary fastener 130. Temporary fastener actuation tool 120 is then moved so that temporary fastener 130 is forced into temporary fastener 130. When inserted into temporary fastener 130, spring clips 124 and protrusion 122 aligns with and contacts indentation 301, thereby securing temporary fastener 130 within temporary fastener actuation tool 120. Body 300 contacts outer bearing 125, and stem 302 contacts inner bearing 126 within temporary fastener 130. Motor shaft 121 is then rotated by rotary tool 110, which in turn rotates bearing shaft 127, inner bearing 126, and ultimately stem 302. Since outer bearing 125 prevents body 300 of temporary fastener 130 from rotating while stem 302 is rotated by inner bearing 126, temporary fastener 130 is actuated to contract tines 306. This loosens and frees temporary fastener 130 from panel 140.

Temporary fastener actuation tool 120 is then retracted away from panel 140, which pulls temporary fastener 130 free from panel 140.

If temporary fastener actuation system 100 is used to install temporary fastener 130 into panel 140, temporary fastener 130 may first be inserted into temporary fastener actuation tool 120. When inserted into temporary fastener 130, spring clips 124 and protrusion 122 aligns with and contacts indentation 301, thereby securing temporary fastener 130 within temporary fastener actuation tool 120. Body 300 contacts outer bearing and stem 302 contacts inner bearing 126. Motor shaft 121 is then rotated by rotary tool 110 in an opposite direct than above, which in turn rotates bearing shaft 127, inner bearing 126, and ultimately stem 302. Since outer bearing 125 prevents body 300 of temporary fastener 130 from rotating while stem 302 is rotated by inner bearing 126, temporary fastener 130 is actuated to expand tines 306. This secures temporary fastener 130 onto panel 140.

If temporary fastener actuation system 100 is used to break temporary fastener 130 loose from sealant that may have cured to temporary fastener 130, outer bearing 125 of temporary fastener actuation tool 120 contacts body 300 of the temporary fastener 130 and rotates body 300 of temporary fastener 130. Collar 170 is configured to contact body 300 of temporary fastener 130 and hold body 300 of temporary fastener 130 stationary when stem 302 is rotated in the opposite direction.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Certain embodiments are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

As used in this document, "each" refers to each member of a set or each member of a subset of a set. Furthermore, as used in the document "or" is not necessarily exclusive and, unless expressly indicated otherwise, can be inclusive in certain embodiments and can be understood to mean "and/or." Similarly, as used in this document "and" is not necessarily inclusive and, unless expressly indicated otherwise, can be inclusive in certain embodiments and can be understood to mean "and/or." All references to "a/an/the element, apparatus, component, means, step, etc." are to be interpreted openly as referring to at least one instance of the element, apparatus, component, means, step, etc., unless explicitly stated otherwise.

Although several embodiments have been illustrated and described in detail, it will be recognized that substitutions and alterations are possible without departing from the spirit and scope of the present disclosure, as defined by the appended claims.

What is claimed is:

1. A temporary fastener actuation system comprising:
   a temporary fastener comprising:
      a cylindrical body comprising an indentation;
      a compressible gasket;
      a stem; and
      a plurality of tines coupled to the stem and configured to:
         expand when the stem is rotated a first direction, thereby securing the temporary fastener to a panel; and
         contract when the stem is rotated a second direction, the second direction being opposite from the first direction;
   a temporary fastener actuation tool comprising:
      a protrusion comprising a groove that matches a shape of the indentation of the temporary fastener;
      a plurality of spring clips, each spring clip comprising an end that is aligned with an end of the protrusion, the plurality of spring clips configured to hold the indentation of the temporary fastener secure against the protrusion;
      a bearing shaft;
      a first bearing coupled to the bearing shaft and configured to contact the cylindrical body of the temporary fastener and rotate the cylindrical body of the temporary fastener in the first direction;

a second bearing coupled to the bearing shaft and configured to contact the stem of the temporary fastener and rotate the stem of the temporary fastener in the second direction; and a motor shaft coupled to the bearing shaft;

a rotary tool configured to:

couple to the motor shaft of the temporary fastener actuation tool;

rotate the motor shaft and the first bearing in the first direction while the second bearing is disengaged from the stem, thereby causing the cylindrical body of the temporary fastener to rotate; and rotate the motor shaft and the second bearing in the second direction while the first bearing is disengaged from the cylindrical body, thereby causing the plurality of tines to contract; and a collar configured to contact the cylindrical body of the temporary fastener and hold the cylindrical body of the temporary fastener stationary when the stem is rotated in the second direction.

2. The temporary fastener actuation system of claim 1, wherein the temporary fastener is used during a manufacturing process to temporarily secure the panel to another panel.

3. The temporary fastener actuation system of claim 1, wherein the rotary tool is a multi-function end effector (MFEE).

4. The temporary fastener actuation system of claim 3, wherein the temporary fastener actuation tool is coupled to the MFEE.

5. The temporary fastener actuation system of claim 1, wherein:

the temporary fastener actuation tool further comprises a spindle coupled to the motor shaft; and the bearing shaft comprises a threaded end that couples the bearing shaft to the spindle.

6. The temporary fastener actuation system of claim 1, wherein the temporary fastener actuation tool is cylindrical in shape.

7. The temporary fastener actuation system of claim 6, wherein:

the protrusion and the plurality of spring clips are coupled to a first end of the temporary fastener actuation tool;

the first bearing is located proximate to the first end of the temporary fastener actuation tool;

the second bearing is located proximate to the first bearing; and the first bearing and the second bearing are both tubular in shape such that at least a portion of the temporary fastener may be inserted through the first bearing and the second bearing.

8. A temporary fastener actuation system comprising:

a temporary fastener actuation tool comprising:

a protrusion comprising a groove that matches a shape of an indentation of a temporary fastener;

a plurality of spring clips, each spring clip comprising an end that is aligned with an end of the protrusion, the plurality of spring clips configured to hold the indentation of the temporary fastener secure against the protrusion;

a bearing shaft;

a first bearing coupled to the bearing shaft and configured to contact a cylindrical body of the temporary fastener and rotate the cylindrical body of the temporary fastener in a first direction;

a second bearing coupled to the bearing shaft and configured to contact a stem of the temporary fastener and rotate the stem of the temporary fastener in a second direction; and a motor shaft coupled to the bearing shaft;

a rotary tool configured to:

couple to the motor shaft of the temporary fastener actuation tool;

rotate the motor shaft and the first bearing in the first direction while the second bearing is disengaged from the stem, thereby causing the cylindrical body of the temporary fastener to rotate; and rotate the motor shaft and the second bearing in the second direction while the first bearing is disengaged from the cylindrical body, thereby causing a plurality of tines of the temporary fastener to contract; and a collar configured to contact a cylindrical body of the temporary fastener and hold the cylindrical body of the temporary fastener stationary when the stem is rotated in the second direction.

9. The temporary fastener actuation system of claim 8, wherein the temporary fastener is used during a manufacturing process to temporarily secure a panel to another panel.

10. The temporary fastener actuation system of claim 8, wherein the rotary tool is a multi-function end effector (MFEE).

11. The temporary fastener actuation system of claim 10, wherein the temporary fastener actuation tool is coupled to the MFEE.

12. The temporary fastener actuation system of claim 8, wherein:

the temporary fastener actuation tool further comprises a spindle coupled to the motor shaft; and the bearing shaft comprises a threaded end that couples the bearing shaft to the spindle.

13. The temporary fastener actuation system of claim 8, wherein the temporary fastener actuation tool is cylindrical in shape.

14. The temporary fastener actuation system of claim 8, wherein:

the protrusion and the plurality of spring clips are coupled to a first end of the temporary fastener actuation tool;

the first bearing is located proximate to the first end of the temporary fastener actuation tool;

the second bearing is located proximate to the first bearing; and the first bearing and the second bearing are both tubular in shape such that at least a portion of the temporary fastener may be inserted through the first bearing and the second bearing.

15. A temporary fastener actuation tool comprising:

a protrusion comprising a groove that matches a shape of an indentation of a temporary fastener;

a plurality of spring clips, each spring clip comprising an end that is aligned with an end of the protrusion, the plurality of spring clips configured to hold the indentation of the temporary fastener secure against the protrusion;

a bearing shaft;

a first bearing coupled to the bearing shaft and configured to contact a cylindrical body of the temporary fastener and rotate the cylindrical body of the temporary fastener in a first direction;

a second bearing coupled to the bearing shaft and configured to contact a stem of the temporary fastener and rotate the stem of the temporary fastener in a second direction; and

a motor shaft coupled to the bearing shaft and configured to:

rotate with the first bearing in the first direction while the second bearing is disengaged from the stem, thereby causing the cylindrical body of the temporary fastener to rotate; and rotate with the second bearing in the second direction while the first bearing is disengaged from the cylindrical body, thereby causing a plurality of tines of the temporary fastener to contract.

16. The temporary fastener actuation tool of claim 15, wherein the temporary fastener is used during a manufacturing process to temporarily secure a panel to another panel.

17. The temporary fastener actuation tool of claim 15, wherein the motor shaft of the temporary fastener actuation tool is configured to couple to a rotary tool.

18. The temporary fastener actuation tool of claim 17, wherein the rotary tool is a multi-function end effector (MFEE).

19. The temporary fastener actuation tool of claim 15, wherein:

the temporary fastener actuation tool further comprises a spindle coupled to the motor shaft; and the bearing shaft comprises a threaded end that couples the bearing shaft to the spindle.

20. The temporary fastener actuation tool of claim 15, wherein:

the protrusion and the plurality of spring clips are coupled to a first end of the temporary fastener actuation tool;

the first bearing is located proximate to the first end of the temporary fastener actuation tool;

the second bearing is located proximate to the first bearing; and the first bearing and the second bearing are both tubular in shape such that at least a portion of the temporary fastener may be inserted through the first bearing and the second bearing.

\* \* \* \* \*